United States Patent [19]

Pedotti et al.

[11] Patent Number: 4,989,259

[45] Date of Patent: Jan. 29, 1991

[54] OPTICAL CORRELATOR FOR INCOHERENT LIGHT IMAGES

[75] Inventors: Antonio Pedotti, Brenta; Giancarlo Ferrigno, Milan, both of Italy

[73] Assignee: Fondazione Projuventute Don Carlo Gnocchi, Milan, Italy

[21] Appl. No.: 465,656

[22] Filed: Jan. 22, 1990

Related U.S. Application Data

[63] Continuation of Ser. No. 30,803, Mar. 27, 1987, abandoned, which is a continuation-in-part of Ser. No. 647,307, Sep. 4, 1984, abandoned.

[51] Int. Cl.[5] .......... G06K 9/64

[52] U.S. Cl. .......... 382/42; 350/3.67; 364/822; 382/31

[58] Field of Search .......... 382/42, 31; 350/162.13, 350/162.14, 3.67, 3.83; 364/822

[56] References Cited

U.S. PATENT DOCUMENTS

| | | | |
|---|---|---|---|
| 2,787,188 | 4/1957 | Berger | 382/42 |
| 3,157,855 | 11/1964 | Babinow | 382/32 |
| 3,227,034 | 1/1966 | Shelton, Jr. | 382/42 |
| 3,602,887 | 8/1971 | Chow | 382/31 |
| 3,756,683 | 9/1973 | Smith, Jr. | 350/162.14 |
| 3,829,832 | 8/1974 | Kawasaki | 382/31 |
| 4,637,056 | 1/1987 | Sherman et al. | 382/42 |

OTHER PUBLICATIONS

Indebetouw et al., "Scanning Optical Reconstruction of Coded Aperture Images", *Applied Physics*, No. 2, 1982, pp. 69–76.

Schuenzel et al., "Credit Card System", *IBM Tech. Disc. Bulletin*, vol. 13, No. 1, Jun. 1970, pp. 176–177.

Shen et al., "Hoe/Lensless Matched Spatial Filter Wavelength-Scaling Correlator", *Optics Communications*, vol. 34, No. 3, Sep. 1980, pp. 316–320.

Laeri et al., "Shortening the Length of an Optical Correlator by the Use of a Lens Array", *Optics Communications*, vol. 29, No. 1, May 1979, pp. 147–150.

*Primary Examiner*—David K. Moore
*Assistant Examiner*—Joseph Mancuso
*Attorney, Agent, or Firm*—Guido Modiano; Albert Josif

[57] ABSTRACT

The optical correlator for incoherent light images herein described can be used in real time image processing systems to recognize objects having selected shapes and sizes and to determine their coordinates. The correlator comprises an objective lens means for focussing an image to be processed, means for diverting the light emerging from said objective lens means into two optical paths, a pair of glass image carriers, each located in one of said optical paths at its focal plane to receive one of the focussed images, a pair of transparencies, each located behind one of said image carriers, lenses, each located behind each transparency and a pair of image sensors, each located behind one of said lenses, to provide electrical signals responsive to the position and intensity of the light passing through the image carriers and the transparencies, and an electrical combining circuit adapted to receive the electrical signals from said sensors and provide an output signal proportional to the difference of intensity of the images received by the two sensors.

2 Claims, 2 Drawing Sheets

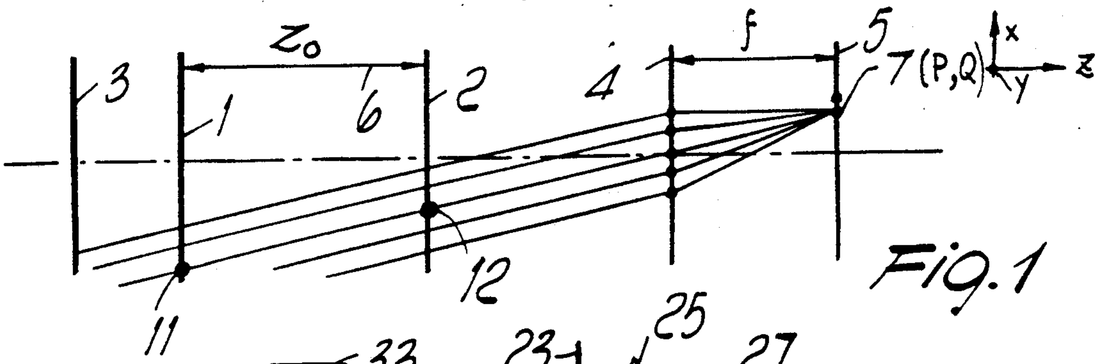
Fig.1
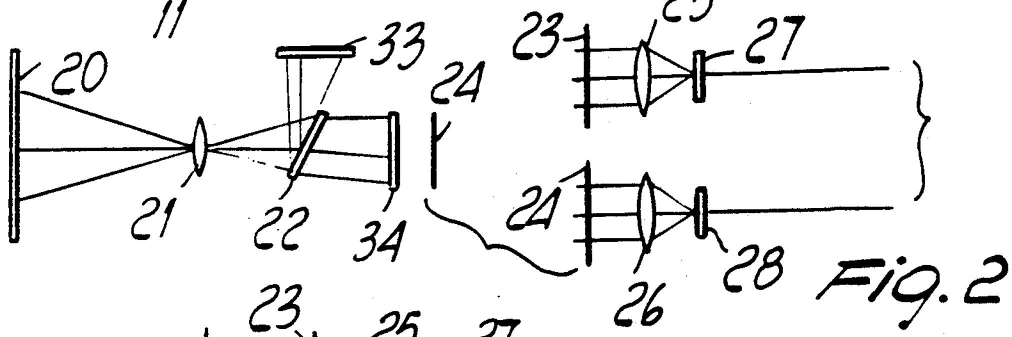
Fig.2
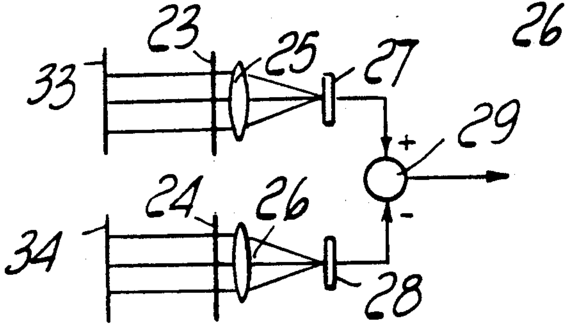
Fig.3
Fig.4
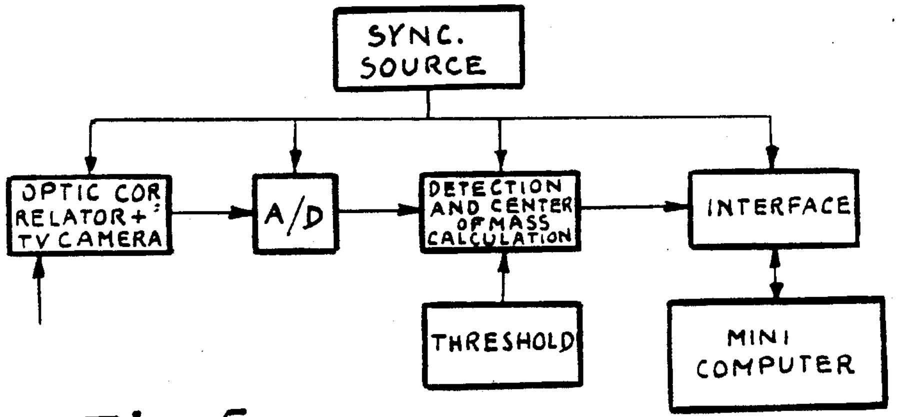
Fig.5
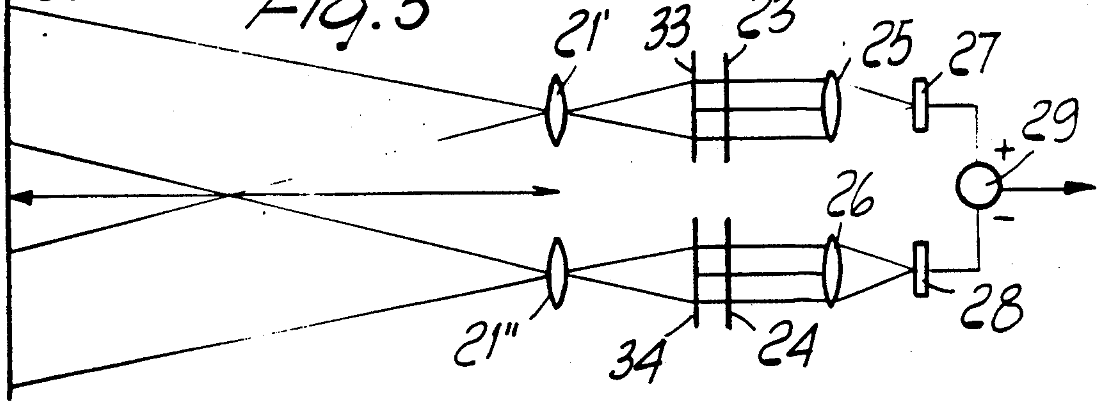

OPTICAL CORRELATOR FOR INCOHERENT LIGHT IMAGES

This is a continuation of application Ser. No. 030,803, filed Mar. 27, 1987, now abandoned, which is a continuation-in-part of the application Ser. No. 06/647.307 filed on Sept. 4, 1984, now abandoned which is incorporated herein by reference.

BACKGROUND OF THE INVENTION

The invention relates to an optical correlator which is able to work with incoherent light, particularly for use in real time image processing systems, which recognizes objects having particular shapes and sizes and determines their coordinates.

It is known that the cross correlation algorithm of images having specified shapes can be used to recognize either stationary or moving objects. Such a method of recognizing objects is described, for example, in our copending U.S. application Ser. No. 615,442 filed on May 30, 1984 is incorporated herein by way of reference and which is summarized hereinafter.

More specifically this application discloses a TV image processing system based on a bidimensional correlation technique and comprising a TV camera for scanning a field where at least one object whose coordinates are to be detected is present, an analog-to-digital converter circuitry adapted to convert information from the TV camera into a digital signal, a correlator circuitry receiving as its input said digital signal to output a function of correlation of said input signal to a settable reference, a reference weighing circuitry couple to the correlator circuitry and cooperating therewith to supply said correlation function, a detector circuitry coupled to the output of the correlator circuitry and adapted to detect that a preset threshold has been exceeded in the correlation function and a computer for processing the correlation function.

Thus, as it should be apparent, this system, and in particular its correlator is constructed by a lot of electronic components which process, in real time, the television image. The number of these electronic components, in particular, increases in proportion to the size of the object to be recognized. As a consequence, when large objects are to be recognized, the complexity and cost of the correlator becomes considerable.

SUMMARY OF THE INVENTION

Accordingly, the main object of the present invention is that of simplifying the above mentioned TV image processing system by providing it with a very simple and comparatively inexpensive correlator.

Another object of this invention is to provide an incoherent light optical correlator, particularly for use in real time image processing systems, which recognizes even large objects having a selected shape and precisaly determines their coordinates and which, moreover, is compatible for use in the system of the above mentioned patent application.

It is a further object to provide an incoherent light optical correlator which is simple to construct and can be readily adapted, without increasing its structural complexity, for recognition of objects having different sizes.

Another object of the invention is to provide an incoherent light optical correlator, suitable for the above use, which can operate at an extremely high data processing rate. The above objects are achieved by an optical correlator, for use in real time image processing systems to recognize objects having selected shaped and sizes and to determine their coordinates, comprising (1) objective lens means for focussing an image to be processed, (2) means for diverting the light emerging from said objective lens means into two optical paths, (3) a pair of ground glass image carriers, each located in one of said optical paths at its focal plane to receive one of the focussed images, (4) a pair of transparencies, each located behind said image carriers in the optical path, (5) a pair of lenses, each located behind each of said transparencies.

(6) a pair of image sensors, each located behind one of said lenses on their focal plane, to provide electrical signals responsive to the position and intensity of the light passing through the transparencies and the image carriers and (7) an electrical combining circuit adapted to receive the electrical signals from said sensors and provide an output signal proportional to the difference of intensity of the images receive by the two sensors.

BRIEF DESCRIPTION OF THE DRAWINGS

Still more features and advantages of the optical correlator using incoherent light, particularly in conjunction with real time image processing systems, to recognize and acquire the coordinates of objects having a selected shape, will be apparent from the following detailed description of a preferred embodiment thereof, as illustrated by way of example, but not limited thereby, in the accompanying drawings, in which:

FIG. 1 illustrates diagrammatically the operation of an incoherent light optic correlator of known type;

FIG. 2 illustrates the optical components of an optical correlator according to the invention;

FIG. 3 illustrates the electrical combination of the signals provided by the optical arrangement shown in FIG. 2;

FIG. 4 is a block diagram showing one method of interconnecting the optical correlator of the invention with a real-time image processing system for the acquisition of the coordinates of objects having various selected shapes and sizes; and FIG. 5 illustrates an alternative configuration which can be used when the objects to be detected are effectively distant from the system.

DESCRIPTION OF THE PREFERRED EMBODIMENTS

Figure 1A:
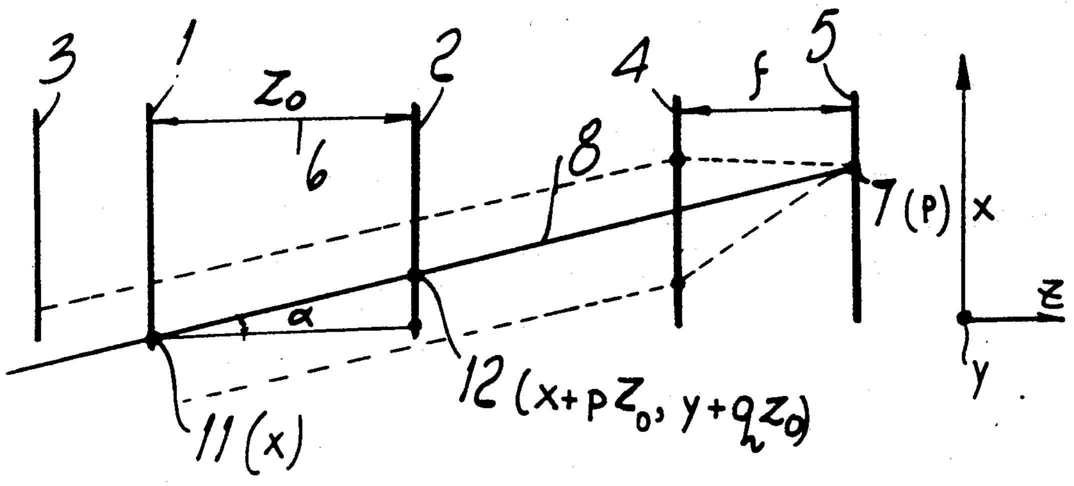
FIGS. 1*a* and 1*b* illustrate diagrammatically the operation of the correlator of FIG. 1.
Figure 1B:
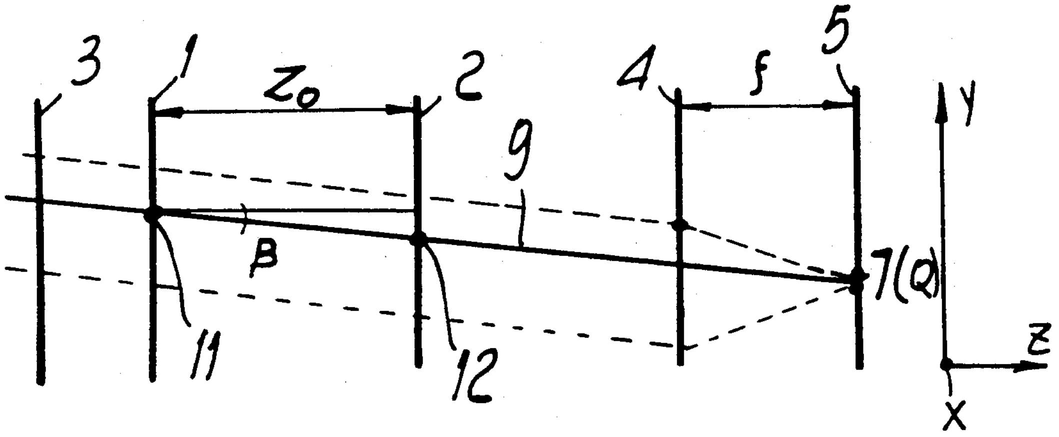

In FIG. 1 there is shown the optical system for an incoherent light correlator of known type. More specifically FIG. 1 shows an opitcal system using incoherent light which is capable of correlating the images carried by two transparencies 1 and 2, or more precisely, of correlating their transmittances.

In FIG. 1, the line 3, denotes an extended source of incoherent light, which is imaged by a lens 4, on to the focal plane shown by the line 5. The lens 4 has a focal length 'f'. The distance between the two transparencies 1 and 2, shown by the arrowed line 6 is denoted by the symbol '$z_o$'.

Assuming that diffraction effects are neglible, or the fine detail of the images carried by the transparencies 1 and 2 is not close to the wavelength of the light from the extended source 3, the optical system effects the cross correlation between the transmittances of the transparencies 1 and 2, which, as is well known in the art, are masks characterized by real positive value grey levels.

More precisely, on each point having the coordinates P, Q and shown by the dots 7 on the focal plane 5, light rays will arrive from only one direction. This is illustrated in detail in FIGS. 1*a* and 1*b*.

The two projections on planes xz and yz, with reference to the xyz frame of FIG. 1, of a light ray, denoted respectively as 8 and 9, pass through the transparencies 1 and 2 making angles $\alpha$ and $\beta$ with the axis. The tangents of these angles take the values p and q respectively. The ray passing through the point (x', y) of transparency 1, shown as the dot 11, meets the transparency 2 at a point $(x+pz_o, y+qz_o)$ shown as the dot 12. $z_o$ is the distance between the transparencies 1 and 2. The intensity of the ray, after passing through the transparencies, is given by the equation:

$$I^*(p,q)=T_1(x,y)\cdot T_2((x+pz_o, y+qz_o)$$

where $I^*_{(p,q)}$ represents the intensity of the ray arriving on the focal plane at the point 7, (P, Q), $T_1$ (x, y) represents the intensity of the light leaving the transparency 1 at the point x, y, $T_2$ (x+pz, y+qz) represents the ratio of the intensities of the light leaving the transparency 2 to that entering it at the point (x+pz, y+qz) (transmittance).

All the rays from this direction converge into the point (P, Q), having coördinates P=Øf and Q=Øf, on the focal plane 5. Since the intensities add together at this point, the overall intensity at P, Q; I(P, Q) is given by the integral:

$$I(P,Q)=\int\int T_1(x,y)\cdot T_2(x+pz_o,y+qz_o)dxdy$$

Thus the mounting or arrangement of the elements effects a real cross correlation. The limitation which arises in this prior art arrangement is that the transmittance of transparency 2 can only assume positive values. The main object of our invention is, in essence, that of removing this limitation in order to apply the optical correlator to the recognition of images in a system of the type described in our above mentioned patent application by using, instead of $T_2$, a predetermined function C(x, y), called reference function, which can assume negative values as well as positive ones.

The optical correlator according to the invention will now be described with reference to FIG. 2. An image 20 which is to be processed, is focussed by an objective lens 21, via a beam splitting device 22, which splits the light beam from the lens 21 so that if falls on to two ground glass image carriers 33 and 34 characterized by the intensity of the light image transmitted by them in the same manner as the transparency 1 described above with respect to FIG. 1. The beam splitter 22, is shown as a partially reflecting mirror however other beam splitting devices such as prisms, birefringent crystals and the like may be used.

If the image 20, is a long distance from the lens 21, compared with its focal length the beam splitter 22 may be eliminated and the lens 21 replaced by two objective lenses, 21' and 21'', as shown in FIG. 5. Under these circumstances the offset due to the distance between the two lenses 21' and 21'' becomes negligible.

Mounted behind each of the image carriers 33 and 34, at distance $z_o$, are two transparencies 23 and 24 which act as the transparency 2 of FIG. 1. Behind these transparencies the lenses 25 and 26, which act as the lens 4 of FIG. 1 are located and on the focal plane of the lenses 25 and 26 are two spatial image detectors or sensors 27 and 28, such as image pick-up tubes or CCD devices which are well known and widely used for the formation of television images. At each pixel element of the image detectors there is generated a signal proportional to the cross correlation between the intensity of the light leaving the image carrier 33 (S(x,y)) and the transmittance of the transparency 23 on the detector 27 and between the intensity of the light leaving the image carrier 34 (always S(x, y)) and the transmittance of the transparency 24 on the detector 28.

The light intensities passed by the image carriers 33 and 34 will only have positive or nil values because of the incoherence of the light used.

On the assumption that the two images on the sensors 27 and 28 are perfectly aligned this limitation on the sign of the intensity may be overcome and this is the main aim of the invention.

The mentioned reference function C (x, y) could be factorized into two components:

$$\begin{aligned} C(x,y) &= C^+(x',y') + C^-(x'',y'') \\ &= C^+(x',y') - |C^-(x'',y'')| \end{aligned}$$

where $x' \neq x''$ and $y' \neq y''$; $x' \epsilon X'$, $y' \epsilon Y'$, $x'' \epsilon X''$, $y'' \epsilon Y''$ and $X' U X'' = X$, $Y' U Y'' = Y$, $x \epsilon X$, $y \epsilon Y$ where x and X represent the set of values of definition of the function C; Cdenotes a function equal to C whenever the latter is positive or zero, and zero whenever the latter is negative. $C^-$is a function equal to C whenever the latter is negative, and zero whenever the latter is positive or zero. The transmittance of the transparency 23 must be modulated by the function $C^+$, while the transmittance of the transparency 24 is modulated by the function $|C^-|$. The output signals from the two sensors 27 and 28 are then combined on a pixel by pixel basis in an electronic combining circuit 29, see FIG. 3, to provide an output $Q_{out}$ where:

$$Q_{out}=Q_1-Q_2$$

It will be shown below how this coincides with having the output ($Q_{out}$) the correlation between the image intensity S and the function C. The output signal $Q_{out}$ is proportional to the intensity I of each individual pixel (Q=KI).

$$\begin{aligned} Q_{out} &= Q_1 - Q_2 = KI_1 - KI_2 \\ &= K\int\int S(x',y')\cdot T_{12}(x' + Pz_o, y' + qz_o)dx'dy' \\ &- K\int\int S(x'',y'')\cdot T_{22}(x'' + Pz_o, y'' + qz_o)dx''dy'' \\ &= K\int\int S(x',y')\cdot C^+(x' + Pz_o, y' + qz_o)dx'dy' \\ &- K\int\int S(x'',y'')|C^-(x'' + Pz_o, y'' + qz_o)|dx''dy'' \\ &= K\{\int\int S(x',y')C^+(x' + pz_o, y' + qz_o)dx'dy' \\ &+ \int\int S(x'',y'')C^-(x'' + pz_o, y'' + qz_o)dx''dy''\} \\ &= K\int\int S(x,y)[C^+(x' + pz_o, y' + qz_o) \\ &+ C^-(x'' + pz_o, y'' + qz_o)]dxdy \\ &= K\int\int S(x,y)C(x + Pz_o, y + qz_o)dxdy \end{aligned}$$

where $T_{12}$ represents the transmittance of the transparency 23, $T_{22}$ is the transmittance of the transparency 24 and S is the intensity of the light leaving each of the two image carriers 33 and 34.

The output of the combined signals from the combining circuit 29 in FIG. 3 is therefore directly the cross correlation between the image S and the function C. In particular the cross correlation functions are in the form of modulated light intensity and converted into electrical signals by means of the photoelectric sensors 27 and 28. The electrical signal information is combined, in the circuit 29 as shown in FIG. 3, on a pixel by pixel basis; from each element of the scanning matrix from the sensor 27 it is subtracted the value obtained in the corresponding scanning matrix from the sensor 28. From these combined signals the final cross correlation function may be calculated. The preferred method of scanning the matrix points is by the raster method in which each of the points in each row are scanned successively.

By operating using the method described in our above mentioned patent application it is possible to recognize objects of any selected shape or size. The recognition is effected by means of an extremely simple system of the optical type using incoherent light. The system uses a minimum of electronic components and is therefore extremely economical. For the transparences 23 and 24 a device, such as a liquid crystal cell, may be used the transmittance of which can be externally modulated. Using such a device it is possible to change the cited function C and adaptively vary the shape to be recognized as described in our above mentioned patent application.

The electrical processing of the output from the optical correlator according to the invention, see FIG. 4, is described in block diagram form. This correlator may be used for the recognition in real time of the coordinates of objects of any desired shape and size from an image. This diagram uses the electrical processing system described in our above mentioned patent application.

It will be appreciated from the foregoing description that the optical correlator according to the invention fully achieves its objects. In particular, an optical correlator using incoherent light has been described having a very high processing rate, a very simple construction and capable of recognizing objects of any chosen shape or size. The optical correlator according to the invention uses an extended incoherent lighted image and avoids the problems of known incoherent light source optical correlators which use a transparency carrying an image of the reference shape which can only take positive transmittance values. The correlator according to the invention is optimally adapted to simplify the complex electronic correlator system used in said patent application.

While the invention has been illustrated in connection with a particular embodiment thereof, it is susceptible to many modifications and variations without departing from the purview of the inventive concept.

We claim:

1. An optical correlator, for use in real time image processing systems to recognize objects having selected shapes and sizes and to determine their coordinates, comprising:

(1) an extended source of incoherent light, (2) objective lens means for focussing an image to be processed, and whereon the light of said extended source is caused to impinge, (3) means for splitting the light of said extended source emerging from said objective lens means into two optical paths, (4) a pair of groung glass carriers, each located in one of said optical paths at its focal plane to receive one of the focussed images, (5) a pair of transparencies, each located behind said ground glass image carriers in the optical path, (6) a pair of lenses, each located behind each of said transparencies, (7) a pair of image sensors each consisting of a matrix of sensing elements, each located behind one of said lenses on their focal plane, to provide electrical signals responsive to the position and intensity of the light passing through the transparencies and the ground glass image carriers, said electrical signals being proportional to the cross correlation between the light leaving each ground glass image carrier and the transmittance of the respective transparency, and (8) a combining circuit adapted to receive the electrical signals from said pair of sensors and provide an output signal proportional to the difference of intensity pixel by pixel of the images received by said pair of sensors, said combining circuit being so designed as to provide either positive or negative values in said cross-correlation, said combining circuit being adapted to combine pixel by pixel the outputs from said pair of sensors to supply at the output of said combining circuit an electrical signal corresponding to said cross correlation between said image and a predetermined function.

2. An optical correlator according to claim 1, wherein each said image carrier consists of a transparent member whose light transmission can be modulated point by point in order to perform mathematical operations on matrices.

* * * * *